United States Patent
Peters et al.

(10) Patent No.: US 11,141,800 B2
(45) Date of Patent: Oct. 12, 2021

(54) DEVICE AND METHOD FOR RE-CONTOURING A GAS TURBINE BLADE

(71) Applicant: Lufthansa Technik AG, Hamburg (DE)

(72) Inventors: Jan Oke Peters, Hamburg (DE);
Thomas Gartner, Hamburg (DE);
Joachim Schoen, Halstenbek (DE);
Stefan Kuntzagk, Hamburg (DE)

(73) Assignee: LUFTHANSA TECHNIK AG, Hamburg (DE)

(*) Notice: Subject to any disclaimer, the term of this patent is extended or adjusted under 35 U.S.C. 154(b) by 293 days.

(21) Appl. No.: 16/083,518

(22) PCT Filed: Mar. 11, 2016

(86) PCT No.: PCT/EP2016/055300
§ 371 (c)(1),
(2) Date: Sep. 10, 2018

(87) PCT Pub. No.: WO2017/152995
PCT Pub. Date: Sep. 14, 2017

(65) Prior Publication Data
US 2019/0070676 A1 Mar. 7, 2019

(51) Int. Cl.
| | |
|---|---|
| *B23C 3/18* | (2006.01) |
| *B24B 19/14* | (2006.01) |
| *B24B 21/16* | (2006.01) |
| *B23P 6/00* | (2006.01) |

(Continued)

(52) U.S. Cl.
CPC .............. *B23C 3/18* (2013.01); *B23P 6/002* (2013.01); *B23Q 9/00* (2013.01); *B23Q 9/0014* (2013.01); *B24B 19/14* (2013.01); *B24B 21/165* (2013.01); *F01D 5/005* (2013.01);

(Continued)

(58) Field of Classification Search
CPC ... B23C 3/18; B23C 2215/44; B23C 2220/40; B23Q 9/00; B23Q 9/0014; B24B 19/14; B24B 21/165; B23P 6/002; F01D 5/005
See application file for complete search history.

(56) References Cited

U.S. PATENT DOCUMENTS

| | | | |
|---|---|---|---|
| 2,680,392 A * | 6/1954 | Clement | B24B 19/14 72/102 |
| 5,197,191 A | 3/1993 | Dunkman et al. | |
| 6,302,625 B1 | 10/2001 | Carey et al. | |

(Continued)

FOREIGN PATENT DOCUMENTS

| | | |
|---|---|---|
| CN | 104010763 A | 8/2014 |
| DE | 69124224 T2 | 8/1997 |

(Continued)

*Primary Examiner* — Moshe Wilensky
(74) *Attorney, Agent, or Firm* — Leydig, Voit & Mayer Ltd.

(57) ABSTRACT

A device for recontouring a gas turbine blade includes: a holding device having at least one cutting tool; and a guide configured to guide the cutting tool along a leading edge of the gas turbine blade. The cutting tool is configured to remove material from the gas turbine blade using a rotational movement about an axis of rotation. The axis of rotation forms an angle together with a chord of the gas turbine blade in a profile section plane, which extends perpendicularly to a radial extent of the gas turbine blade, and the angle is less than 45°.

19 Claims, 2 Drawing Sheets

(51) Int. Cl.
   *F01D 5/00*   (2006.01)
   *B23Q 9/00*   (2006.01)
(52) U.S. Cl.
   CPC ...... *B23C 2215/44* (2013.01); *B23C 2220/40* (2013.01); *Y02T 50/60* (2013.01)

(56) References Cited

U.S. PATENT DOCUMENTS

| | | |
|---|---|---|
| 6,320,625 B1 | 11/2001 | Suzuki et al. |
| 2009/0269206 A1 | 10/2009 | Yelistratov et al. |
| 2012/0047735 A1 | 3/2012 | Czerner |
| 2013/0161297 A1 | 6/2013 | Czerner |
| 2015/0013126 A1 | 1/2015 | Czerner |

FOREIGN PATENT DOCUMENTS

| | | |
|---|---|---|
| DE | 102010036042 B3 | 2/2012 |
| DE | 102011102543 A1 | 11/2012 |
| DE | 102011089701 A1 | 6/2013 |
| DE | 102014224920 A1 | 6/2016 |
| EP | 1410873 A2 | 4/2004 |
| EP | 2530242 A2 | 12/2012 |
| JP | 10148766 A | 6/1998 |
| RU | 2198778 C2 | 2/2003 |

* cited by examiner

DEVICE AND METHOD FOR RE-CONTOURING A GAS TURBINE BLADE

CROSS-REFERENCE TO PRIOR APPLICATIONS

This application is a U.S. National Stage Application under 35 U.S.C. § 371 of International Application No. PCT/EP2016/055300 filed on Mar. 11, 2016. The International Application was published in German on Sep. 14, 2017, as WO 2017/152995 A1 under PCT Article 21(2).

FIELD

The invention relates to a device and a method for recontouring a gas turbine blade.

BACKGROUND

Components in gas turbines, in particular in aircraft engines, are subjected to wear caused by erosive particles, for example sand or dust, during operation. In the front portion of the gas turbine, namely in the region of the compressor, erosion generally leads to flattening of the leading edges or roughening of the compressor blades. The first stage of the compressor (Stage 1 HPC Blade) is particularly affected by this erosive action, but so too are all other guide vanes and rotor blades of the compressor. The compressor blades have an aerodynamically optimised profile in the unworn state thereof, which profile is negatively altered by means of wear. As a consequence of such a deterioration of the aerodynamic profile, the gas turbine loses efficiency, i.e. the specific fuel consumption (SFC) increases. From a financial point of view, it is therefore desirable to counteract the wear of compressor blades, in particular a deterioration of aerodynamically optimised blade shapes. For this purpose, repair methods have been established which aim to provide damaged compressor blades with shapes that are as aerodynamically optimal as possible.

DE 10 2010 036 042 B3 discloses a method for recontouring a compressor or turbine blade for a gas turbine. In this method, a portion of the compressor or turbine blade is melted in a targeted manner by means of an energy beam, for example a laser beam, such that the material solidifies to form a predefined new contour without adding any additional material.

DE 10 2011 102 543 A1 discloses a device by means of which the gas turbine blade can also be recontoured when installed. For this purpose, a cutting tool is used which is moved by means of a guide device along a leading edge, which is to be recontoured, of the gas turbine blade. Furthermore, by means of the guide device, the engagement depth and thus the amount of material removed is set. Moreover, the device includes a camera, by means of which the recontouring of the gas turbine blade can be monitored. In the solution proposed here, the material is removed by means of a rotational movement of a cutting tool about an axis of rotation, the axis of rotation being oriented so as to be substantially perpendicular to the axial extent of a chord of the gas turbine blade and in the circumferential direction of the gas turbine. An orientation of this kind of the axis of rotation of the cutting tool is also disclosed in U.S. Pat. No. 6,320,625 B1.

Furthermore, a machining tool that is used for machining a gas turbine blade when the blade is installed is disclosed in DE 691 24 224 T2. In this case, a rotary cutting tool may be moved in a linear direction by means of the device in a spatial direction that is perpendicular to the axis of rotation of the cutting tool. It is thus possible to eliminate indentations in the leading edge caused by material removal. However, a disadvantage of this solution is that a rotational movement of the entire machining tool is required for a recontouring process in the transition region between the pressure side and suction side.

An additional device for recontouring gas turbines is known from DE 10 2011 089 701 A1. This document discloses a support system by means of which the cutting tool can be moved along a surface of the gas turbine blade. It is proposed that at least one support bears against a side edge and at least one additional side support bears against the pressure and/or suction side of the gas turbine blade.

A device for recontouring a gas turbine blade is known from EP 2 530 242 A2, a brush that can rotate about an axis being used as a tool.

SUMMARY

In an embodiment, a device for recontouring a gas turbine blade is provided that includes: a holding device having at least one cutting tool; and a guide configured to guide the cutting tool along a leading edge of the gas turbine blade. The cutting tool is configured to remove material from the gas turbine blade using a rotational movement about an axis of rotation. The axis of rotation forms an angle together with a chord of the gas turbine blade in a profile section plane, which extends perpendicularly to a radial extent of the gas turbine blade, and the angle is less than 45°.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
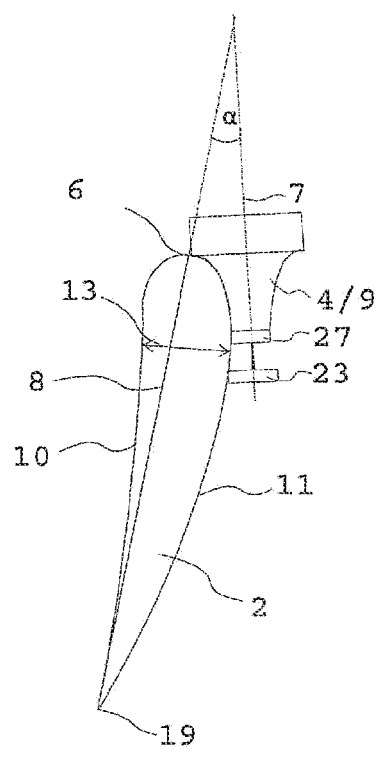
FIG. 1 is a sectional view of a gas turbine blade having a radial milling cutter on a suction side of the gas turbine blade.

Embodiments of the present invention provide a device and a method by means of which the recontouring of gas turbine blades in the installed state thereof can be improved.

According to embodiments of the invention, a device for recontouring a gas turbine blade is provided, which includes a holding device including at least one cutting tool, and a guide device for guiding the cutting tool along a leading edge of the gas turbine blade, the cutting tool removing material from the gas turbine blade by means of a rotational movement about an axis of rotation, the axis of rotation forming an angle together with a chord of the gas turbine blade in a profile section plane, which extends perpendicularly to a radial extent of the gas turbine blade, the angle being less than 45°.

The chord should be understood to mean the direct connection line between a front edge, i.e. the leading edge, and a rear edge of the gas turbine blade in a plane that is perpendicular to a radial extent of the gas turbine blade, i.e. in the profile section plane.

On account of the orientation according to the invention of the axis of rotation relative to the chord, a particularly advantageous positioning of the cutting tool in relation to the gas turbine blade to be machined is possible. In addition to allowing recontouring of the actual leading edge, the orientation also allows simple machining of the pressure side and/or suction side of the gas turbine blade. Preferably, the entire front portion of the pressure and/or suction side that adjoins the leading edge is machined in this way by means of the cutting tool, the length of the chord preferably not being shortened by the machining. By using the device according to the invention, the front region of the gas turbine blade that is directed into the air mass flow can assume a new desired shape. In this way, the flow losses produced by the erosive action can be reduced and thus the specific fuel consumption can be reduced.

By means of an angle between the axis of rotation and the chord in the profile section plane of less than 45°, it is in particular possible for the device to be supported on the pressure and/or suction side during recontouring. Furthermore, there is the advantage that the device can be moved between the gas turbine blades in the radial direction along the entire leading edge when the blades are installed. Preferably, the angle may also be less than 30°, more preferably less than or equal to 25°.

Further the axis of rotation may be oriented orthogonally to the leading edge. An orthogonal orientation within the meaning of the invention should also be understood to mean angles preferably of between 85° and 95° between the axis of rotation and the leading edge. The orthogonal orientation of the axis of rotation relative to the leading edge allows for as a great a contact surface area as possible between the cutting tool and the gas turbine blade, which produces a homogeneous grinding pattern. Furthermore, by means of the orthogonal orientation, tilting of the cutting tool relative to the gas turbine blade is prevented, such that the process reliability as a whole is increased.

Preferably, the angle between the axis of rotation of the cutting tool and the chord of the gas turbine blade is less than 20°, more preferably less than 15°. Furthermore, the axis of rotation is preferably oriented substantially in parallel with the chord. A substantially parallel orientation should preferably be understood in this case to mean an angle between the axis of rotation and the chord of less than 10°, more preferably less than 5°, and particularly preferably less than 2°. Furthermore, it is advantageous if a deviation from the parallel orientation in the radial direction is less than the circumferential component of the deviation. The small angle between the axis of rotation of the cutting tool and the chord of the gas turbine blade brings the advantage that the device can be used so as to use even less space and thus gas turbine blades that are close together can also be machined.

Since the chord changes depending on the radial distance, the chord is always defined by the profile section plane on which the device is located. The device is thus designed to allow for the orientation according to the invention of the axis of rotation relative to the chord over the entire radial extent of the gas turbine blade.

Preferably, the cutting tool is formed of a radial milling cutter or a radial grinding wheel. This brings the advantage that the gas turbine blade can be brought into a desired shape by means of a machining process without complex movement control. Preferably, the radial milling cutter or grinding wheel is brought into position on the gas turbine blade to be machined for this purpose; in order to recontour the gas turbine blade over the entire radial extent thereof, the radial milling cutter or grinding wheel must then merely be moved radially inwardly or outwardly in a substantially linear movement. Depending on the surface to be recontoured, radial milling cutters and/or grinding wheels having different radii can be used, it also being possible to use uniform standard radial milling cutters and/or standard radial grinding wheels in series engines that are prefabricated in series specifically for the series engines. The radial milling cutter or grinding wheel is preferably arranged relative to the gas turbine blade such that it bears tangentially against the leading edge during the machining process.

In some embodiments, the radial milling cutter may also be formed of a radial grinding wheel. This brings the advantage that the surface roughness can be reduced in comparison with a machining process by means of the radial milling cutter on the machined surfaces.

In alternative embodiments, the cutting tool is advantageously formed of a contour milling cutter or a contour grinding wheel. Thus, any desired shape can result from the machining process, such that gas turbine blades having complex shapes can also be machined. Combinations of radial milling cutter/radial grinding wheel with contour milling cutter/contour grinding wheel are also conceivable.

The cutting tool is preferably dimensionally stable during machining, i.e. it advantageously has a predefined and unchanging shape during machining. It is further provided for the shape of the cutting tool to correspond to a desired shape of the gas turbine blade, in particular a pressure side or a suction side of the gas turbine blade in the region of the leading edge. As a result, the cutting tool only has to be positioned once relative to the gas turbine blade to be machined during the machining process in order to machine the pressure or suction side. It is therefore possible to dispense with a complex control device for guiding the movement of the cutting tool along a desired shape of the gas turbine blade. On account of the above-mentioned features, the cutting tool according to the invention can be distinguished from tools which change their shape at least in part during and as a result of the machining, for example a broom.

Preferably, the cutting tool extends in an axial direction at least over a length that corresponds to one half of the maximum profile thickness of the gas turbine blade. On account of this axial extent, a front portion of the gas turbine blade can be machined in a machining step. In conventional gas turbine blades, the profile thickness rapidly increases starting from the leading edge in the front region, such that the incoming air mass flow directly strikes the front portion close to the leading edge. The efficiency of the gas turbine blade is thus dependent in particular on the shape of the portion of the gas turbine blade. On account of the axial extent of the radial milling cutter over at least half of the profile thickness, the front portion can have an aerodynamic shape after recontouring.

Furthermore, the guide device is preferably formed of at least one spacing element, which bears against the leading edge by means of a compressive force, the distance between the leading edge and the cutting tool advantageously being adjustable by means of the at least one spacing element.

Preferably, in addition to a first spacing element, a second spacing element is provided in order for guiding of the cutting tool to be distinctly oriented on the leading edge of the gas turbine blade. Preferably, the cutting tool is in this case arranged between the first and second spacing element. The spacing elements are thus adjusted such that material is removed preferably on only the convex or concave surfaces of the pressure or suction side. Material is not removed directly from the leading edge of the gas turbine blade, and therefore the length of the chord remains constant during the machining process. This brings the advantage that the number of machining processes can be increased before the gas turbine blade has to be exchanged or subjected to maintenance work.

Preferably, at least one first support is provided for orienting the cutting tool relative to a pressure side or suction side of the gas turbine blade. By means of the support, suitable spacing of the cutting tool from the pressure or suction side of the gas turbine blade can be achieved. Preferably, the first support is arranged relative to the cutting tool such that the first support rests on the pressure or suction side of the gas turbine blade at a distance of less than 20 mm from the leading edge during the machining process, preferably less than 15 mm and particularly preferably less than 10 mm.

In an embodiment, in addition to the first support, a second support is provided, the second support being arranged axially behind or axially spaced apart from the first support. This brings the advantage that the angle between the chord and the axis of rotation can be adjusted by means of the two axially successive supports. In this case, the angle can be altered on account of the supports being at the same distance from the axis of rotation and bearing against the curved contour of the gas turbine blade, such that when the supports are shifted, the distance between the bearing point on the surface and the chord is changed. Alternatively, the distances between the supports and the axis of rotation may also be different, such that the angle between the axis of rotation and the chord can be altered by changing the distance between the supports. The cutting tool, together with the spacing elements, can be arranged in a suitable position relative to the gas turbine blade and moved in the radial direction along the gas turbine blade. Additional means for support, for example relative to the engine housing, can thus be omitted. Preferably, in this embodiment, the second support is arranged relative to the cutting tool such that the second support rests on the pressure or suction side of the gas turbine blade at a distance of less than 20 mm from the leading edge during the machining process, preferably less than 15 mm and particularly preferably less than 10 mm. Preferably, the first and second support rest on the pressure or suction side of the gas turbine blade at a distance from the leading edge of less than ⅓ of the length of the chord.

Furthermore, in an embodiment, at least one of the supports is designed to enable low friction movement of the support relative to the pressure side or suction side. For this purpose, the support can be made from a friction-reducing material, for example Teflon. Alternatively, a spherical support may be used, which allows low-friction movement of the support relative to the pressure or suction side of the gas turbine blade both in the radial and in the axial direction.

Preferably, a limiting element for limiting the movement of the cutting tool along the leading edge is provided. Preferably, the limiting element is arranged such that a movement of the cutting tool is limited radially outwardly. Alternatively or additionally, a limiting element can be arranged such that it limits the movement of the cutting tool radially inwardly. By limiting the movement of the cutting tool, the cutting tool can be prevented from coming into contact with adjacent components of the gas turbine, e.g. the inner face of the gas turbine housing, and thus from damaging the components.

Preferably, the connection between the holding device and the cutting tool is releasable by simple means, such that a cutting tool for the pressure side and/or for the suction side can optionally be fastened to the holding device. Releasable by simple means means, in the context of the present application, that the cutting tool is securely connected to the holding device during operation; however, release by hand or using tools and muscle power is possible. Therefore, a single device can be used to machine various contours of the gas turbines.

Furthermore, the holding device preferably includes a first cutting tool for machining the pressure side, and a second cutting tool for machining the suction side. It is therefore possible, in a machining step, to machine both the pressure and the suction side of the gas turbine blade, either simultaneously or, depending on the arrangement of the cutting tools relative to one another, within a predetermined time interval. By means of an arrangement of this kind, both the setup time and the machining time can be reduced, which results in a more efficient and more cost-effective recontouring process.

According embodiments of the invention, a method for recontouring a gas turbine blade is further provided, using a device according to the invention, the device being guided axially from the front, through the opening formed when a variable bleed valve is removed, to a first stage of the high-pressure compressor. By means of the opening, the device can be arranged on one of the gas turbines of the first stage of the high-pressure compressor with little effort. Preferably, the inlet guide vanes (IGV) are in this case oriented axially.

The invention is described in the following on the basis of preferred embodiments, with reference to the accompanying drawings.

Figure 2:
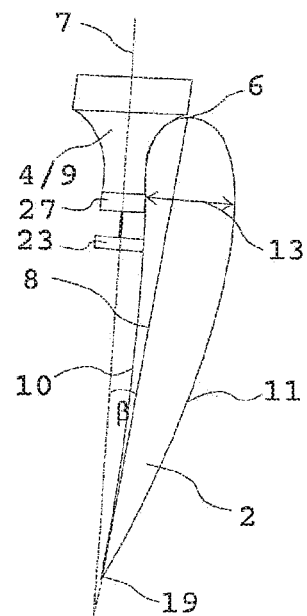
FIG. 2 is a sectional view of a gas turbine blade having a radial milling cutter on a pressure side of the gas turbine blade.

FIG. 1 and FIG. 2 show a gas turbine blade 2 including a pressure side 10 and a suction side 11, which blade is for example installed in a compressor or turbine of a gas turbine, the blade in this case being a guide vane or rotor blade, for example. A device 1 according to the invention and the method according to the invention can be particularly easily applied to the first stage of the high-pressure compressor when the compressor is installed on account of the easy accessibility thereof; the gas turbine blade 2 shown in FIG. 1 to FIG. 4 is therefore preferably a blade of the first stage of the high-pressure compressor.

In principle, however, the device 1 and the method may also be applied in other gas turbine blades 2, both when the blades are installed and when they have been removed; the device 1 may be used for machining both stator vanes and rotor blades.

Figure 3:
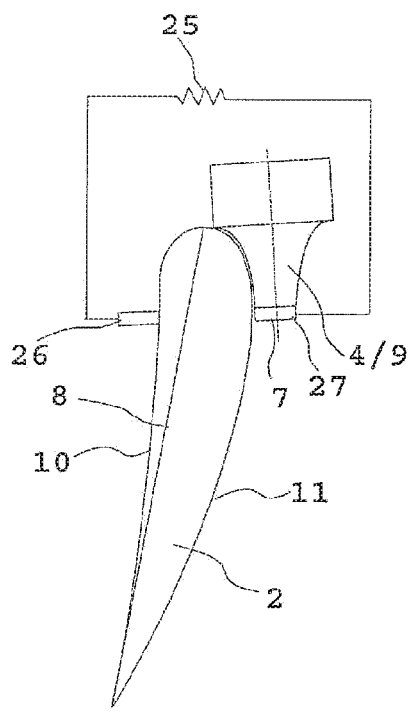
FIG. 3 is a schematic sectional view showing mounting of the radial milling cutter on a gas turbine blade.

In FIG. 1 to FIG. 3, a profile section plane of the gas turbine blade is shown which extends perpendicularly to a radial extent of the gas turbine blade. Furthermore, a chord 8 is shown which is formed of a direct connection line between a front and a rear edge 19 of the gas turbine blade 2 in the profile section plane. The front edge is in this case formed by the leading edge 6. Furthermore, the maximum profile thickness 13 of the gas turbine blade 2 is shown.

In the following, the statements of direction "radial direction" ("radial"), "axial direction" ("axial") and "circumferential direction" are used. These statements of direction relate to an axis of rotation 22 of the gas turbine, which is shown in FIG. 4, if no other reference is given.

Figure 4:
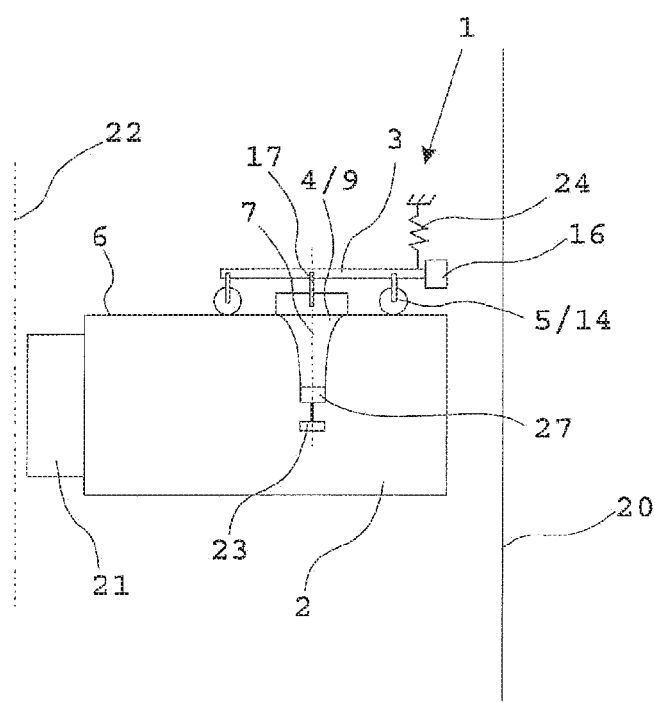
FIG. 4 is a schematic sectional view of a device according to the invention during the machining process on a gas turbine blade.

FIG. 4 shows a schematic sectional view of the device 1 for recontouring the gas turbine blade 2, including a holding device 3, a cutting tool 4, two guide devices 5 and a limiting element 16. It is explicitly noted that FIG. 4 should be understood to be a schematic drawing and that it is not to scale. The holding device 3 has the function of mounting the cutting tool 4 relative to the gas turbine blade 2 to be machined.

The cutting tool 4 is rotatably mounted in the holding device 3 via a connection 17 that is releasable by simple means, such that the cutting tool 4 can rotate about an axis of rotation 7. The cutting tool 4 can thus be exchanged depending on the shape of the gas turbine blade 2 to be machined. This makes it possible, for example, to first machine the pressure side 10 using a first cutting tool 4 and then to machine the suction side 11 using a second cutting tool 4. Preferably, the cutting tool 4 is a radial milling cutter 9 or a radial grinding wheel. The cutting tool 4 is preferably electrically driven; alternatively, it may be driven hydraulically or pneumatically. The rotational speed depends on the type of cutting tool 4 and the diameter thereof. Preferably, multiblade milling cutters or grinding wheels are used as the cutting tools 4.

Preferably, a suction means is provided on the device 1 according to the invention, by means of which the chips produced during the machining process can be suctioned off. A borescope is also preferably provided which is used to control and monitor the machining process.

In order to be able to recontour the gas turbine blade 2 even when installed, reliable positioning of the cutting tool 4 relative to the gas turbine blade 2 to be machined must be ensured. This is necessary such that the desired shape of the gas turbine blade 2 can be achieved as best as possible by means of the recontouring process and such that damage to adjacent components of the gas turbine can be prevented. A housing 20 of the gas turbine is shown in FIG. 4 in order to illustrate the positioning of the device 1 relative to the gas turbine blade 2. The radially inner face of the gas turbine blade 2 is connected to a fastening element 21 via a root; the gas turbine blade 2 thus rotates about the axis of rotation 22 during operation. Furthermore, it can be seen in FIG. 4 that the device 1 bears against the leading edge 6 via two guide devices 5. The guide device 5 is in this case preferably formed of a first and a second spacing element 14 and 15 and is used to position the cutting tool 4 at a predetermined distance from the gas turbine blade 2. Preferably, the first and the second spacing element 14 and 15 are each formed of a roller that is rotatably mounted relative to the holding device 3. Preferably, the second spacing element 15 is the same size as the first spacing element 14, i.e. the rollers have identical radii. The cutting tool 4 is preferably arranged relative to the spacing elements 14 and 15 such that the length of the chord 8 cannot be shortened by means of the machining.

In an alternative embodiment, it is also possible for the guide device 5 to not rest directly on the leading edge 6, but rather in an adjacent region, for example.

It is advantageous if the cutting tool 4 is mounted relative to the pressure side 10 or suction side 11 by means of a first support 27. Preferably, in addition to the first support 27, a second support 23 is provided, by means of which the angles α and ß can be set if the cutting tool 4 is machining the pressure side 10 or the suction side 11, respectively (see FIG. 1 and FIG. 2). The angles α and ß result from the intersection of the axis of rotation 7 with the chord 8 in the profile section plane. In order to reach a suitable compromise between a reliable setting of the angles α and ß and a compact design of the device 1, the distance between the first and the second support 27 and 23 in the direction of the axis of rotation 7 is preferably less than ½ of the length of the chord 8, more preferably less than ⅓ of the length of the chord 8 and particularly preferably less than ⅕ of the length of the chord 8. The angles α and B are preferably set based on the size of the supports 27 and 23, by means of which the distance between the axis of rotation 7 and the surface of the pressure or suction side 10 or 11, respectively, is set at two points. The size of the support 27 or 23 is in this case understood to mean the distance set by means of the support 27 or 23 between the axis of rotation 7 and the relevant contact point on the pressure or suction side 10 or 11, respectively. Depending on the use of the device 1 on the pressure or suction side 10 or 11, the size of the supports 27 and 23 may vary. Preferably, the size of the first support 27 differs from the size of the second support 23. Alternatively, there is also the possibility of using supports 23 and 27 of an identical size, it then being possible to change the angles α and ß also by changing the distance between the supports 27 and 23 if the supports 27 and 23 bear against a curved surface of the gas turbine blade 2.

Furthermore, FIG. 3 shows that recontouring using the device 1 according to the invention is always associated with material removal, the length of the chord 8 remaining constant. Only the profile thickness is reduced by means of the machining. A desired shape of the gas turbine blade 2 sought to be achieved after the recontouring process is therefore always different from the original shape of the gas turbine blade 2; nevertheless, the shape is always within the tolerance range specified by the manufacturer. In the embodiment shown in FIG. 3 too, in addition to the first support 27, the second support 23 may also be provided.

By means of a pressing element 24, which is for example formed of a spring element, it can be ensured that the device 1 and thus also the cutting tool 4 bear against the gas turbine blade 2 in the axial direction in a reliable manner in the region of the leading edge 6. The pressing element 24 is in this case preferably connected to the holding device 3. In order for the pressing device 24 to be able to apply an axial force relative to the gas turbine blade 2, the pressing device is fastened to a gas turbine component that is fixed in the axial direction, for example to a part of the housing 20. Preferably, the device 1 is pressed on or guided by hand. Alternatively, the device 1 can be supported via the trailing edge 19.

In order for the gas turbine blade 2 to be able to be recontoured over the entire radial extent thereof, the device 1 must be movable along the leading edge 6. Preferably, the spacing elements 14 and 15, as already explained previously, are formed of rollers. The rollers are preferably oriented such that a rolling movement in the radial direction is possible. Furthermore, the limiting element 16 is arranged on the holding device 3 such that the movement of the device 1 can be limited radially outwardly by means of the limiting element 16. It is therefore ensured that the cutting tool 4 does not damage any adjacent components of the gas turbine. Preferably, the limiting element 16 is designed to be resilient, such that the risk of damage is also reduced by means of the limiting element 16. In an alternative embodiment of the invention, a second spacing element may also be provided, by means of which the movement of the device 1 is limited radially inwardly.

FIG. 1 and FIG. 2 are detailed, schematic views of the cutting tool 4, which is formed here of a radial milling cutter 9. The radial milling cutter 9 is preferably ball-bearing mounted, such that it can rotate about the axis of rotation 7 with little loss. Alternatively, the use of a duo radial milling cutter or radial grinding wheel is also conceivable.

Preferably, the radius or contour of the radial milling cutter 9 corresponds to the desired shape of the pressure or suction side 10 or 11, respectively, in the region of leading edge 6. During the recontouring process, the radial milling cutter 9 bears against the gas turbine blade 2 in the region of the leading edge 6. Depending on the surface to be machined, the radial milling cutter 9 is arranged for this purpose on the pressure side 10 (see FIG. 1) or on the suction side 11 (see FIG. 2). Because the shape of the pressure and suction side 10 and 11, respectively, differs, different radial milling cutters must be used.

Irrespective of the side of the blade machined, the angle α or ß is less than 45°, more preferably less than 30°, particularly preferably less than 15°. In this case, the axis of rotation 7 is preferably oriented orthogonally to the leading edge 6 (see FIG. 4). An orthogonal orientation between the axis of rotation 7 and the leading edge 6 within the meaning of the present application should be understood to mean an angle preferably of between 85° and 95°.

Preferably, the axis of rotation 7 of the radial milling cutter 9 is oriented substantially in parallel with the chord 8 (see FIG. 1 and FIG. 2). A substantially parallel orientation between the axis of rotation 7 and the chord 8 in the context of the present application should be understood to mean a divergence between the axis of rotation 7 and the chord 8 of less than 10°, more preferably less than 5°, and particularly preferably less than 2°. In this case, the divergence of the axis of rotation 7 from the chord 8 may be greater than the above-mentioned values irrespective of the direction, i.e. the radial or circumferential direction.

By twisting the gas turbine blade 2, the angle α or ß can vary depending on the radial positioning of the device 1 on the gas turbine blade 2.

FIG. 3 schematically shows a support element 26 which is connected to the holding device 3 or cutting tool 4 via a pressing element 25. The pressing element 25 is preferably formed of a spring element and is used to press the cutting tool 4 against the pressure or suction side 10 or 11, respectively. The support element 26 is preferably formed of a roller system, more preferably a roller, such that rolling in the radial direction is possible. The support element 26 preferably bears against the pressure or suction side 10 or 11, respectively, that is opposite the radial milling cutter 9. Thus, it is ensured that the first support 27 and alternatively also the second support 23 bear against the opposite pressure or suction side 10 or 11 in a reliable manner during the entire machining process.

In an alternative embodiment, a first radial milling cutter 9 for machining the pressure side 10 and a second radial milling cutter 9 for machining the suction side 11 are provided on the holding device 15. Therefore, both the pressure side 10 and the suction side 11 can be recontoured in one machining step. In this case, the support element 26 is preferably formed of one of the radial milling cutters 9, more preferably by a first and/or second support 27 and/or 23 that is assigned to the radial milling cutter 9.

Preferably, the device 1 is used on a gas turbine blade that is still installed in the gas turbine. The gas turbine blade is in this case accessed via an opening which is formed when a variable bleed valve (VBV) is removed. Preferably, the variable inlet guide vanes (IGV) are axially oriented. Preferably, the device 1 and thus the cutting tool 4 are moved axially from the front to the gas turbine blade.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for recontouring a gas turbine blade, the system comprising:
the gas turbine blade; and
a blade recontouring device, the blade recontouring device comprising:
a holding device comprising at least one cutting tool, the cutting tool comprising a cutting element and a plurality of supports, wherein the cutting tool extends in an axial direction at least over a length that corresponds to one half of a predetermined maximum profile thickness of the gas turbine blade and
a guide configured to guide the cutting tool along a leading edge of the gas turbine blade on either a suction side or a pressure side of the gas turbine blade,
wherein the plurality of supports comprises a first support appended axially to a bottom end of the cutting tool, and adjustably-positioned axially above a second support mechanically connected to a bottom surface of the first support, further wherein the first support is configured as having a first size and the second support is configured as having a second size such that less than a 45° angle is formed between an axis of rotation of the cutting tool and a chord of the gas turbine blade in a condition where the blade recontouring device is attached to the gas turbine blade,
wherein the cutting tool is configured to remove material from the gas turbine blade using a rotational movement about the axis of rotation,
wherein the axis of rotation forms the less than 45° angle together with the chord of the gas turbine blade in a profile section plane, which extends perpendicularly to a radial extent of the gas turbine blade, and wherein the second support is the same size as the first support.

2. The system according to claim 1, wherein the cutting tool is dimensionally stable during machining.

3. The system according to claim 1, wherein the cutting tool comprises a radial milling cutter, a radial grinding wheel, a contour milling cutter, or a contour grinding wheel.

4. The system according to claim 1, wherein the axis of rotation is oriented orthogonally to the leading edge.

5. The system according to claim 1, wherein the angle is less than or equal to 25°.

6. The system according to claim 1, wherein the shape of the cutting tool corresponds to a desired shape of the gas turbine blade.

7. The system according to claim 1, wherein the cutting tool extends in an axial direction at least over a length that corresponds to one half of the maximum profile thickness of the gas turbine blade.

8. The system according to claim 1, wherein:
the guide comprises at least one spacing element, which bears against the leading edge by means of a compressive force, and
an axial distance between the leading edge and the cutting tool is adjustable by using the at least one spacing element.

9. The system according to claim 1, wherein at least one of the supports is configured to orient the cutting tool relative to the pressure side or the suction side of the gas turbine blade.

10. The system according to claim 9, wherein:
to the at least one support comprises a first support and a second support,
the second support being arranged axially behind the first support.

11. The system according to claim 9, wherein at least one of the supports is configured to reduce friction of movement of the support relative to the pressure side or suction side in the radial direction.

12. The system according to claim 1, the device further comprising a limiting element configured to limit the movement of the cutting tool along the leading edge.

13. The system according to claim 1, wherein a connection between the holding device and the cutting tool is releasable such that a pressure side cutting tool or a suction side cutting tool can optionally be fastened to the holding device.

14. The system according to claim 1, wherein:
the at least one cutting tool comprises a first cutting tool for machining a pressure side and a second cutting tool for machining a suction side.

15. A blade-recontouring device for a gas turbine blade, the device comprising:
a holding device comprising at least one cutting tool, the cutting tool comprising a cutting element and a plurality of supports, wherein the cutting tool extends in an axial direction at least over a length that corresponds to one half of a predetermined maximum profile thickness of the gas turbine blade; and
a guide configured to guide the cutting tool along a leading edge of the gas turbine blade on either a suction side or a pressure side of the gas turbine blade,
wherein the plurality of supports comprises a first support appended axially to a bottom end of the cutting tool, and adjustably-positioned axially above a second support mechanically connected to a bottom surface of the first support, further wherein the first support is configured as having a first size and the second support is configured as having a second size such that less than a 45° angle is formed between an axis of rotation of the cutting tool and a chord of the gas turbine blade in a condition where the device is attached to the gas turbine blade, and
wherein the cutting tool is configured to remove material from the gas turbine blade using a rotational movement around the axis of rotation,
wherein the second support is the same size as the first support.

16. A method for recontouring the gas turbine blade using the blade-recontouring device of claim 15, the method comprising:
axially guiding the blade-recontouring device from a front of a gas turbine engine, through an opening formed when a variable bleed valve is removed, to a first stage of a high-pressure compressor.

17. The device according to claim 15, wherein the cutting tool comprises a radial milling cutter, a radial grinding wheel, a contour milling cutter, or a contour grinding wheel.

18. The device according to claim 15, wherein:
the guide comprises at least one spacing element, which bears against the leading edge by means of a compressive force, and
an axial distance between the leading edge and the cutting tool is adjustable by using the at least one spacing element.

19. The device according to claim 15, wherein:
the at least one cutting tool comprises a first cutting tool for machining the pressure side and a second cutting tool for machining the suction side.

* * * * *